(12) United States Patent
Jones et al.

(10) Patent No.: US 11,192,207 B2
(45) Date of Patent: Dec. 7, 2021

(54) ADDITIVE MANUFACTURED OBJECT WITH PASSAGE HAVING VARYING CROSS-SECTIONAL SHAPE

(71) Applicant: General Electric Company, Schenectady, NY (US)

(72) Inventors: Jeffrey Clarence Jones, Simpsonville, SC (US); Zachary John Snider, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 16/172,091

(22) Filed: Oct. 26, 2018

(65) Prior Publication Data

US 2020/0130101 A1    Apr. 30, 2020

(51) Int. Cl.
*B23K 26/342* (2014.01)
*B33Y 10/00* (2015.01)
*B33Y 80/00* (2015.01)
*B33Y 30/00* (2015.01)
B23K 26/082 (2014.01)

(52) U.S. Cl.
CPC ........... *B23K 26/342* (2015.10); *B33Y 10/00* (2014.12); *B33Y 30/00* (2014.12); *B33Y 80/00* (2014.12); *B23K 26/082* (2015.10)

(58) Field of Classification Search
CPC ......... B33Y 80/00; B33Y 10/00; B33Y 30/00; B33Y 50/02; B22F 2003/1057; B22F 3/1055; B22F 5/009; B22F 5/10; B22F 5/106; B23K 26/082; B23K 26/342; B32B 1/00; B32B 1/08; B32B 2605/18
See application file for complete search history.

(56) References Cited

U.S. PATENT DOCUMENTS

| 9,713,843 | B2 | 7/2017 | Snyder et al. |
| 9,849,510 | B2 | 12/2017 | Lacy et al. |
| 2009/0255602 | A1 | 10/2009 | McMasters et al. |
| 2011/0123312 | A1 | 5/2011 | Venkataramanan et al. |
| 2013/0156549 | A1 | 6/2013 | Maldonado |
| 2014/0251585 | A1 | 9/2014 | Kusuda et al. |
| 2014/0305529 | A1 | 10/2014 | Kroll et al. |
| 2015/0114611 | A1* | 4/2015 | Morris ............... B23P 15/26 165/166 |
| 2016/0332229 | A1* | 11/2016 | Snyder ............... F01D 25/12 |
| 2019/0113163 | A1* | 4/2019 | Godfrey ............... B33Y 80/00 |

FOREIGN PATENT DOCUMENTS

CN    111097912 A    5/2020
EP    3115131 A1    11/2017

* cited by examiner

*Primary Examiner* — Yan Lan
(74) *Attorney, Agent, or Firm* — James Pemrick; Hoffman Warnick LLC

(57) ABSTRACT

A passage incorporated into an additively manufactured object, the object and a related method are disclosed. The object has an additive manufacture build direction. The passage includes: a first portion aligned along an axis oriented less than approximately 45° from the build direction; and a second portion aligned along an axis oriented greater than approximately 45° from the build direction, the second portion including at least one self-supporting top surface portion including at least one edge aligned no greater than approximately 45° from the build direction. The passage having varying cross-sectional shape along a non-linear length accommodates additive manufacture regardless of build direction.

13 Claims, 7 Drawing Sheets

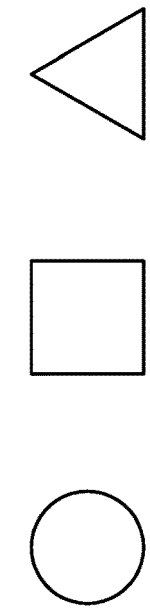
FIG. 5A  FIG. 5B  FIG. 5C
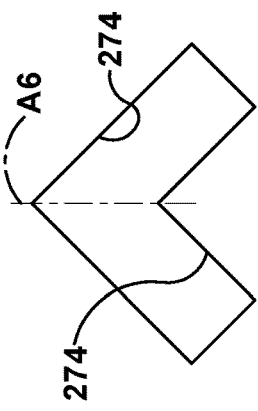
FIG. 7A
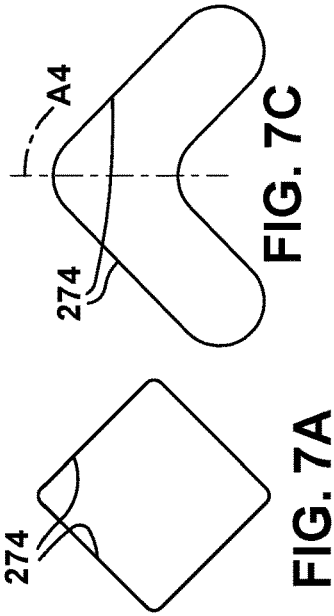
FIG. 7B
FIG. 7C
FIG. 7D
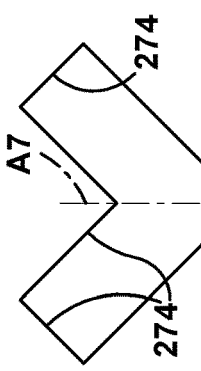
FIG. 7E
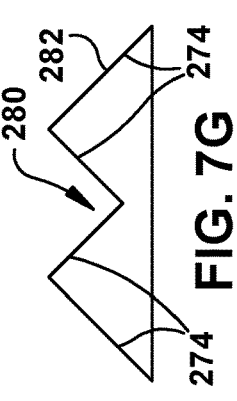
FIG. 7F
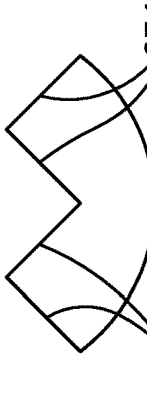
FIG. 7G
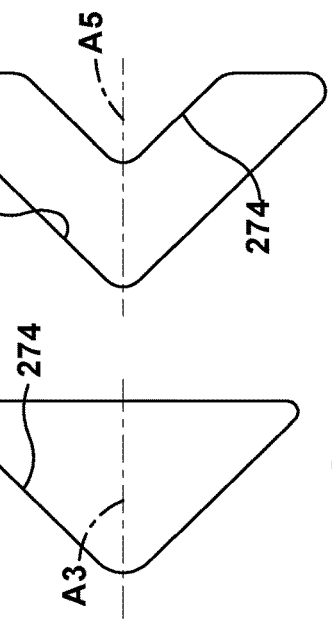
FIG. 7H
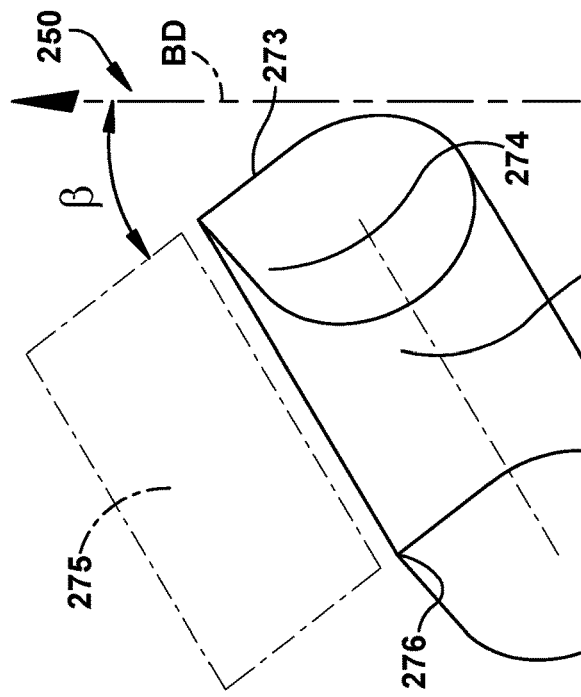
FIG. 6

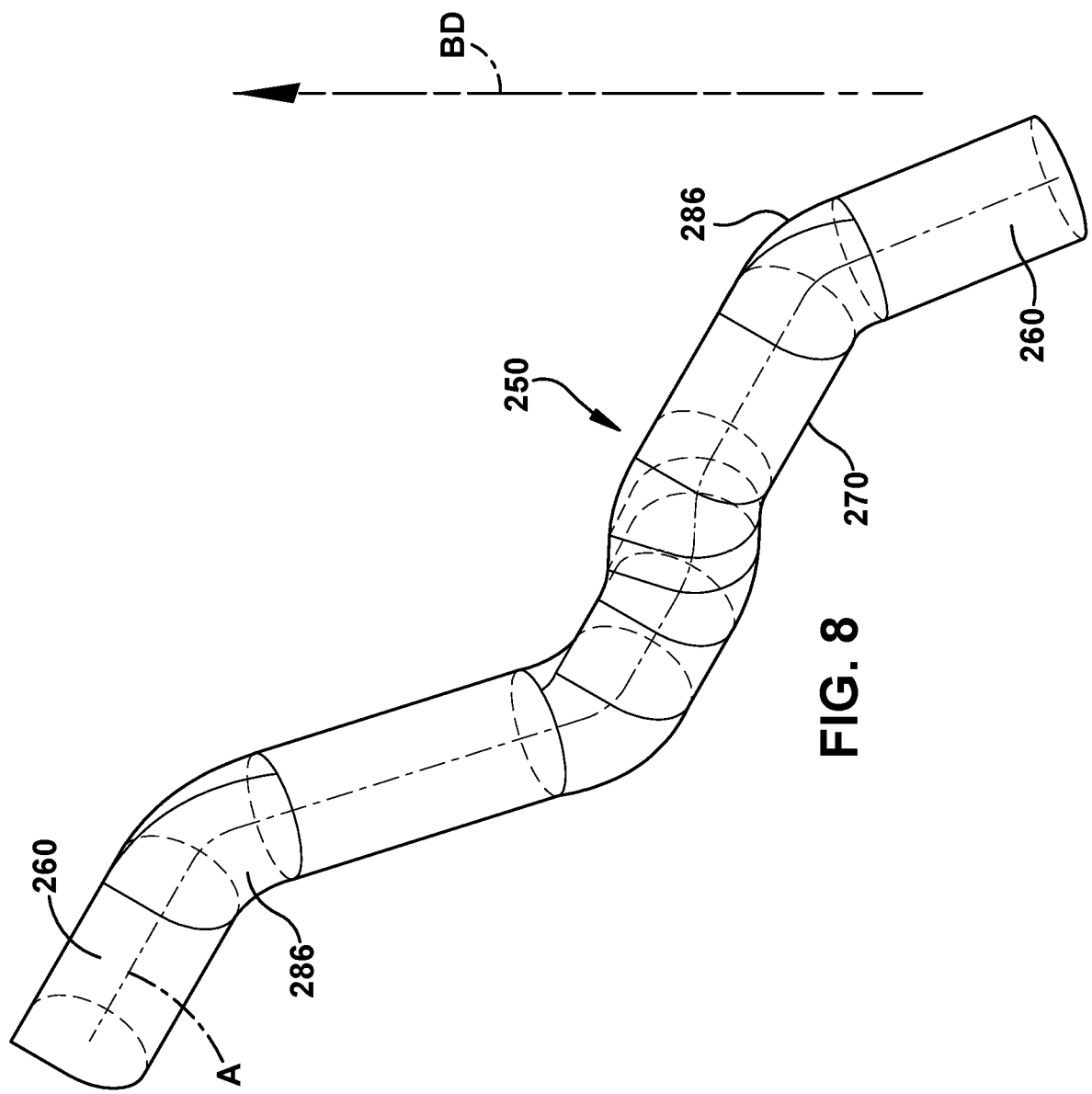

ADDITIVE MANUFACTURED OBJECT WITH PASSAGE HAVING VARYING CROSS-SECTIONAL SHAPE

BACKGROUND OF THE INVENTION

The disclosure relates generally to additive manufacture, and more particularly, to an object with a passage having a varying cross-sectional shape along a non-linear length thereof to accommodate additive manufacture regardless of build direction.

The pace of change and improvement in the realms of power generation, aviation, and other fields has accompanied extensive research for manufacturing objects or components used in these fields. Conventional manufacture of metallic, plastic or ceramic composite objects generally includes milling or cutting away regions from a slab of material before treating and modifying the cut material to yield a part, which may have been simulated using computer models, e.g., in drafting software. Manufactured objects which may be formed from metal can include, e.g., airfoil objects for installation in a hot gas path of a turbomachine such as an aircraft engine or power generation system. The objects may include passages therein, such as cooling passages that allow for delivery of a coolant to retain a temperature of the object in a safe range.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer, including vectors, images or coordinates. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the object.

In metal powder additive manufacturing techniques, such as direct metal laser melting (DMLM) (also referred to as selective laser melting (SLM)), metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the object geometry can be fused by selectively melting the metal powder. The melting may be performed by a high powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two dimensional layer, and the process repeats until the object is completely formed. In order to create certain larger objects faster, some metal additive manufacturing systems employ two or more high powered lasers that work together to form an object.

One limitation of additive manufacturing is an inability to print at an angle more than about 45° from a build direction, which is typically in a vertical direction. The additive manufacturing limitation presents challenges relative to forming passages in objects, such as cooling passages in hot gas path (HGP) objects for a turbomachine, that are not linear, i.e., they are curvilinear. Current passages must be oriented at less than 45° relative to the build direction. Further, current passages typically have circular cross-sections and are generally linear. Where passages are at more than 45° relative to the build direction, they require complex supports. Otherwise, passages must be re-routed in the object prior to manufacture to avoid unprintable orientations based on a specific build direction.

BRIEF DESCRIPTION OF THE INVENTION

A first aspect of the disclosure provides a passage incorporated into an additively manufactured object, the object having a build direction, the passage comprising: a first portion aligned along an axis oriented less than approximately 45° from the build direction; and a second portion aligned along an axis oriented greater than approximately 45° from the build direction, the second portion including at least one self-supporting top surface portion including at least one edge aligned no greater than approximately 45° from the build direction.

A second aspect of the disclosure provides an additively manufactured (AM) hot gas path (HGP) object, comprising: a body having a passage therein, the passage including: a first portion aligned along an axis oriented less than approximately 45° from the build direction; and a second portion aligned along an axis oriented greater than approximately 45° from the build direction, the second portion including at least one self-supporting top surface portion including at least one edge aligned no greater than approximately 45° from the build direction.

A third aspect of the disclosure provides a method to additively manufacture an object including a passage, the method comprising: selectively fusing a metal powder in a metal powder bed to form an initial shaped layer of a body of the object; and repeating the selective fusing on a layer-by-layer basis to form the body of the object with the passage, wherein the passage includes: a first portion aligned along an axis oriented less than approximately 45° from the build direction; and a second portion aligned along an axis oriented greater than approximately 45° from the build direction, the second portion including at least one self-supporting top surface portion including at least one edge aligned no greater than approximately 45° from the build direction.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 5A-C show a number of possible cross-sections for a first portion of the passage according to embodiments of the disclosure.

FIG. 6 shows a schematic view of a section of a second portion of the passage that includes at least one self-supporting top surface portion including edge(s) aligned no greater than approximately 45° from a build direction, according to embodiments of the disclosure.

FIGS. 7A-H show cross-sectional views of illustrative second portions of the passage that include self-supporting top surface portion(s) including edge(s) aligned no greater than approximately 45° from a build direction, according to embodiments of the disclosure.

FIG. 8 shows an enlarged section of a passage including transition portions between the first and second portions of the passage, according to embodiments of the disclosure.

Figure 1:
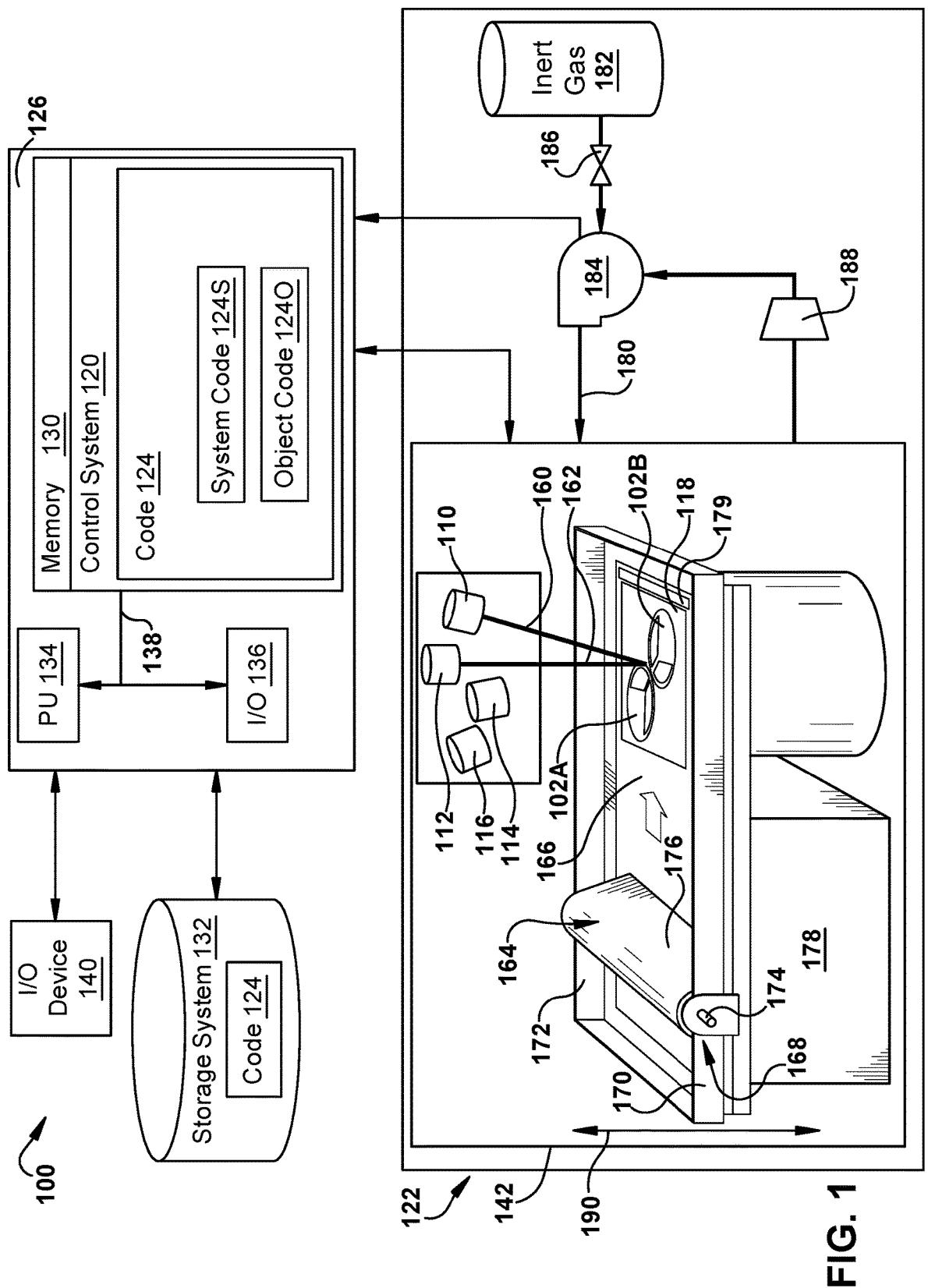
FIG. 1 shows a block diagram of an additive manufacturing system and process including a non-transitory computer readable storage medium storing code representative of an object according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant components. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular object may be referred to using several different or overlapping terms. What may be described herein as being a single part may include and be referenced in another context as consisting of multiple objects. Alternatively, what may be described herein as including multiple objects may be referred to elsewhere as a single part.

In addition, several descriptive terms may be used regularly herein, and it should prove helpful to define these terms at the onset of this section. These terms and their definitions, unless stated otherwise, are as follows. Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a passage incorporated into an additively manufactured object, the object and a related method. The object has an additive manufacture build direction. The passage may include a first portion aligned along an axis oriented less than approximately 45° from the build direction; and a second portion aligned along an axis oriented greater than approximately 45° from the build direction. The second portion includes at least one self-supporting top surface portion including at least one edge aligned no greater than approximately 45° from the build direction. Accordingly, the passage has a varying cross-sectional shape along a non-linear length, which accommodates additive manufacture regardless of build direction.

FIG. 1 shows a schematic/block view of an illustrative computerized metal powder additive manufacturing system 100 (hereinafter 'AM system 100') for generating an object(s) 102, which may include one large object or multiple objects, e.g., two objects 102A, 102B as shown, of which only a single layer is shown. The teachings of the disclosures will be described relative to building object(s) 102 using multiple melting beam sources, e.g., four lasers 110, 112, 114, 116, but it is emphasized and will be readily recognized that the teachings of the disclosure are equally applicable to build multiple object(s) 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Object(s) 102 are illustrated as circular elements; however, it is understood that the additive manufacturing process can be readily adapted to manufacture any shaped object, a large variety of objects and a large number of objects on a build platform 118.

AM system 100 generally includes a metal powder additive manufacturing control system 120 ("control system") and an AM printer 122. As will be described, control system 120 executes object code 124O to generate object(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU)

134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate object(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining object(s) 102 to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122.

Object code 124O defining object(s) 102 may include a precisely defined 3D model of an object and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of object(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Object code 124O representative of object(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing object(s) 102 into a series of thin slices that assembles using AM printer 122 in successive layers of material.

AM printer 122 may include a processing chamber 142 that is sealed to provide a controlled atmosphere for object(s) 102 printing, e.g., a set pressure and temperature for lasers, or a vacuum for electron beam melting. A build platform 118, upon which object(s) 102 is/are built, is positioned within processing chamber 142. A number of melting beam sources 110, 112, 114, 116 are configured to melt layers of metal powder on build platform 118 to generate object(s) 102. While four melting beam sources 110, 112, 114, 116 will be described herein, it is emphasized that the teachings of the disclosure are applicable to a system employing any number of sources, e.g., 1, 2, 3, or 5 or more.

Figure 2:
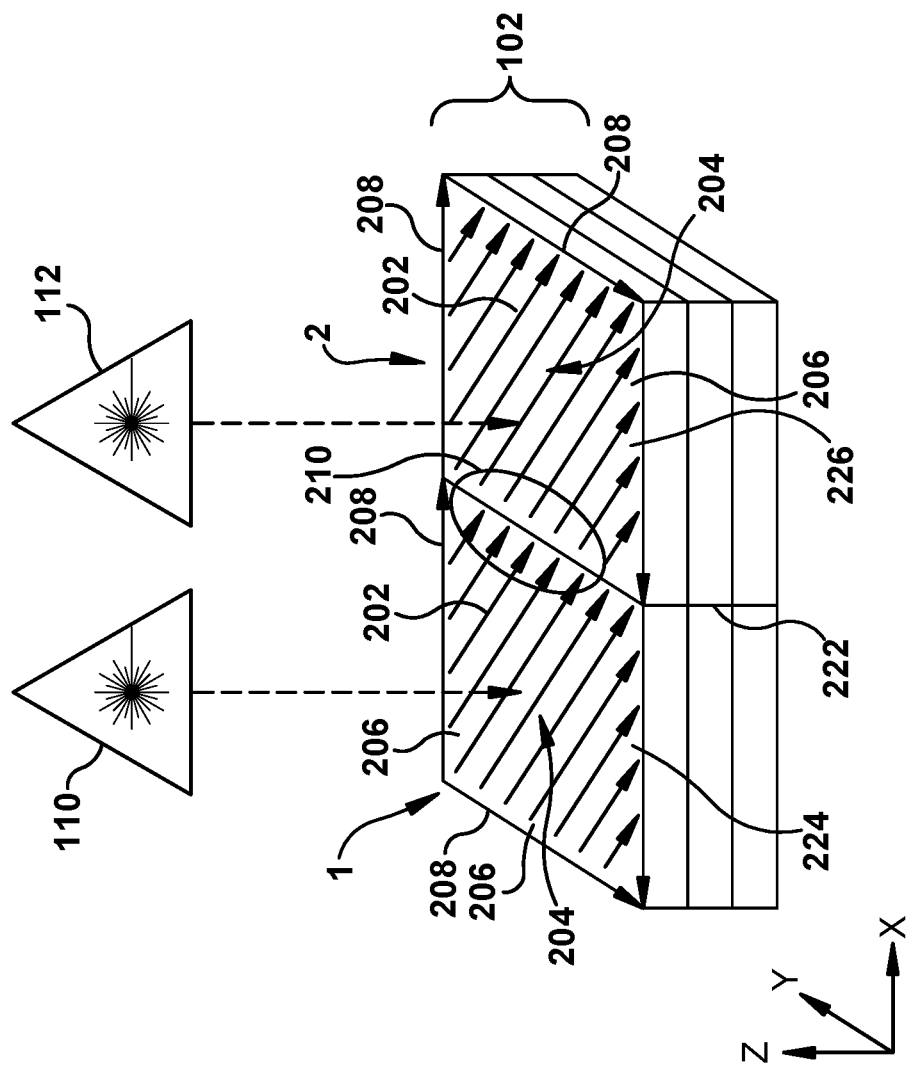
FIG. 2 shows a schematic perspective view of a two melting beam source additive manufacturing system building an object.

FIG. 2 shows a schematic perspective view of melting beams of AM system using two melting beam sources 110, 112, e.g., lasers. During operation, the melting beam(s) (dashed lines) are guided, e.g., by scanner mirrors for lasers or electromagnetic field/electric coils for electron beams, along scan vectors (paths), which are indicated by arrows on a top surface of illustrative object 102. Internal scan vectors 202 melt inner regions 204 of object 102 that scan linearly across a layer, and a very thin border 206 is melted with one to three contour scan vectors 208 that only follow a desired outer edge of the layer. Each laser 110, 112 has its own field (1 and 2, respectively) upon which it can work. Each melting beam source 110, 112 may work within only a small portion of its respective field at any given time. Each field and the scan vectors are assigned to one or the other source 110, 112 with an interface 210 (within circle) where fields 1, 2 of pair of sources 110, 112 meet. Which scan vector is made by which source usually depends on the region that can be reached by each source. Each melting beam source 110, 112 is calibrated in any now known or later developed manner. That is, each melting beam source 110, 112 has had its laser or electron beam's anticipated position relative to build platform 118 correlated with its actual position in order to provide an individual position correction (not shown) to ensure its individual accuracy. Interface 210 in body 222 of object 102 defines a first portion 224 and a second portion 226 of body 222 made by different melting beam sources 110, 112 of multiple melting beam source AM system 100 during a single build. Here, fields 1, 2 meet at a line, creating a planar interface 228 in object 102. Alternatively, scan vectors 202 within fields 1, 2 may overlap in interface 210 to create a continuous or gradient interface between first and second portions 224, 226.

Figure 3:
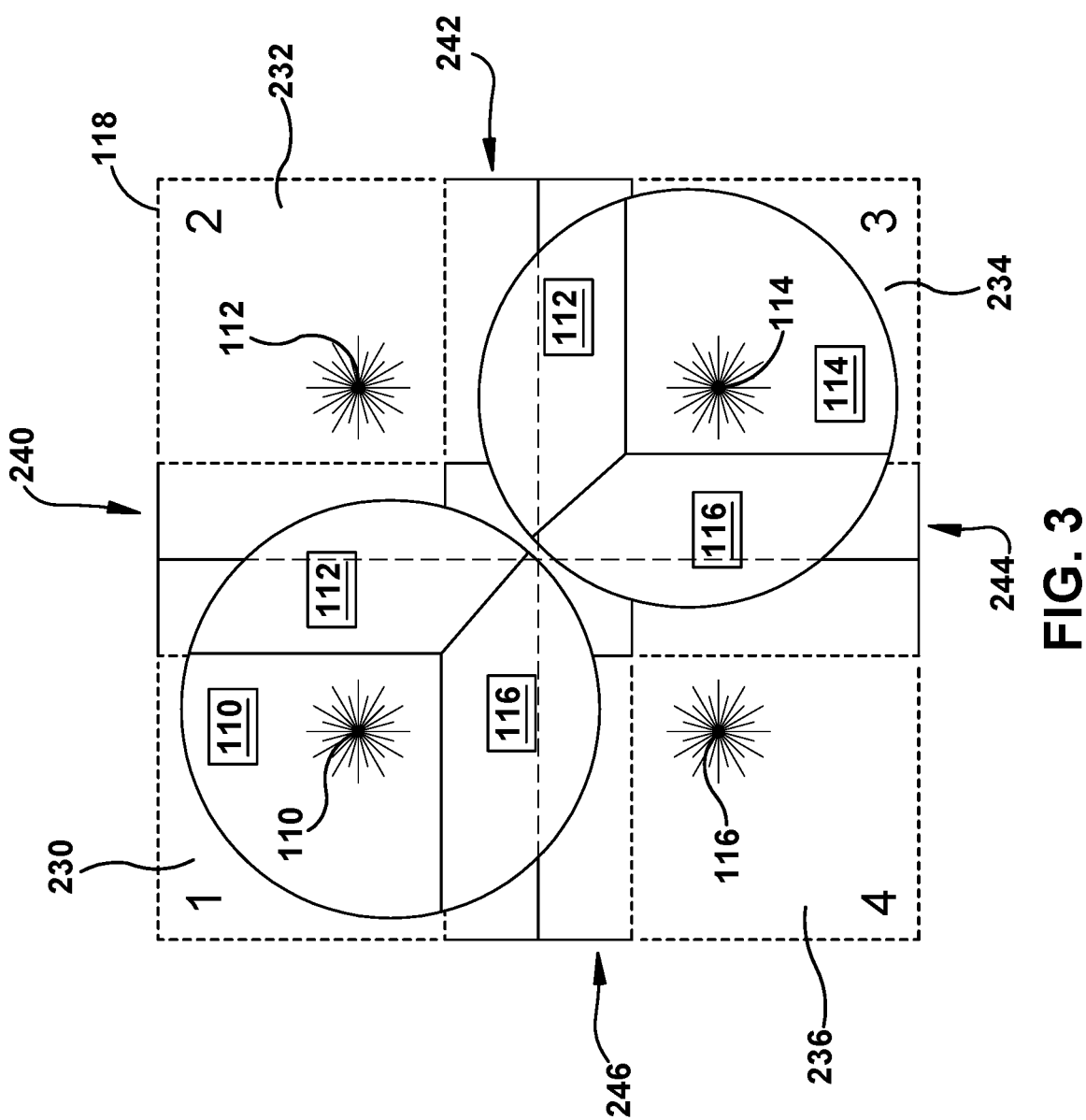
FIG. 3 shows a schematic plan view of respective fields of a four melting beam source additive manufacturing system.

FIG. 3 shows a schematic plan view of melting beams of AM system using four melting beam sources 110, 112, 114, 116, e.g., lasers. Each melting beam source 110, 112, 114, 116 has a field 1, 2, 3 or 4 including a non-overlapping field region 230, 232, 234, 236, respectively, in which it can exclusively melt metal powder, and at least one overlapping field region or interfaces 240, 242, 244, 246 in which two or more sources can melt metal powder. (Boxed numbers of sources 110, 112, 114, 116 indicate which source creates the shape illustrated thereabout). In this regard, each melting beam source 110, 112, 114, 116 may generate a melting beam (two shown, 160, 162, in FIG. 1), respectively, that fuses particles for each slice, as defined by object code 124O. For example, in FIG. 1, melting beam source 110 is shown creating a layer of object 102 using melting beam 160 in one region, while melting beam source 112 is shown creating a layer of object 102 using melting beam 162 in another region. Each melting beam source 110, 112, 114, 116 is calibrated in any now known or later developed manner. That is, each melting beam source 110, 112, 114, 116 has had its laser or electron beam's anticipated position relative to build platform 118 correlated with its actual position in order to provide an individual position correction (not shown) to ensure its individual accuracy. In one embodiment, each of plurality melting beam sources 110, 112, 114, 116 may create melting beams, e.g., 160, 162 (FIG. 1), having the same cross-sectional dimensions (e.g., shape and size in operation), power and scan speed. It is recognized that while four sources 110, 112, 114, 116 have been illustrated to describe an interface for overlapping fields, any two sources may create overlapping fields.

Returning to FIG. 1, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a body 176 configured to move along opposing rails 170, 172, and an actuator element (not shown in FIG. 1) in the form of a tip, blade or brush configured to spread metal powder evenly over build platform 118, i.e., build platform 118 or a previously formed layer of object(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 1, a stock of raw material may be held in a raw material source 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, object(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$).

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer in a build direction, e.g., a build platform 118 may lower and/or chamber 142 and/or applicator 164 may rise after each layer. Vertical adjustment system 190 may include any now known or later developed linear actuators to provide such adjustment that are under the control of control system 120. The "build direction" (indicated by "BD" in later figures) as used herein refers to the direction in which build platform 118 is moved to accommodate the addition of each new layer, which is typically a vertical direction.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build platform 118 to generate object(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 4:
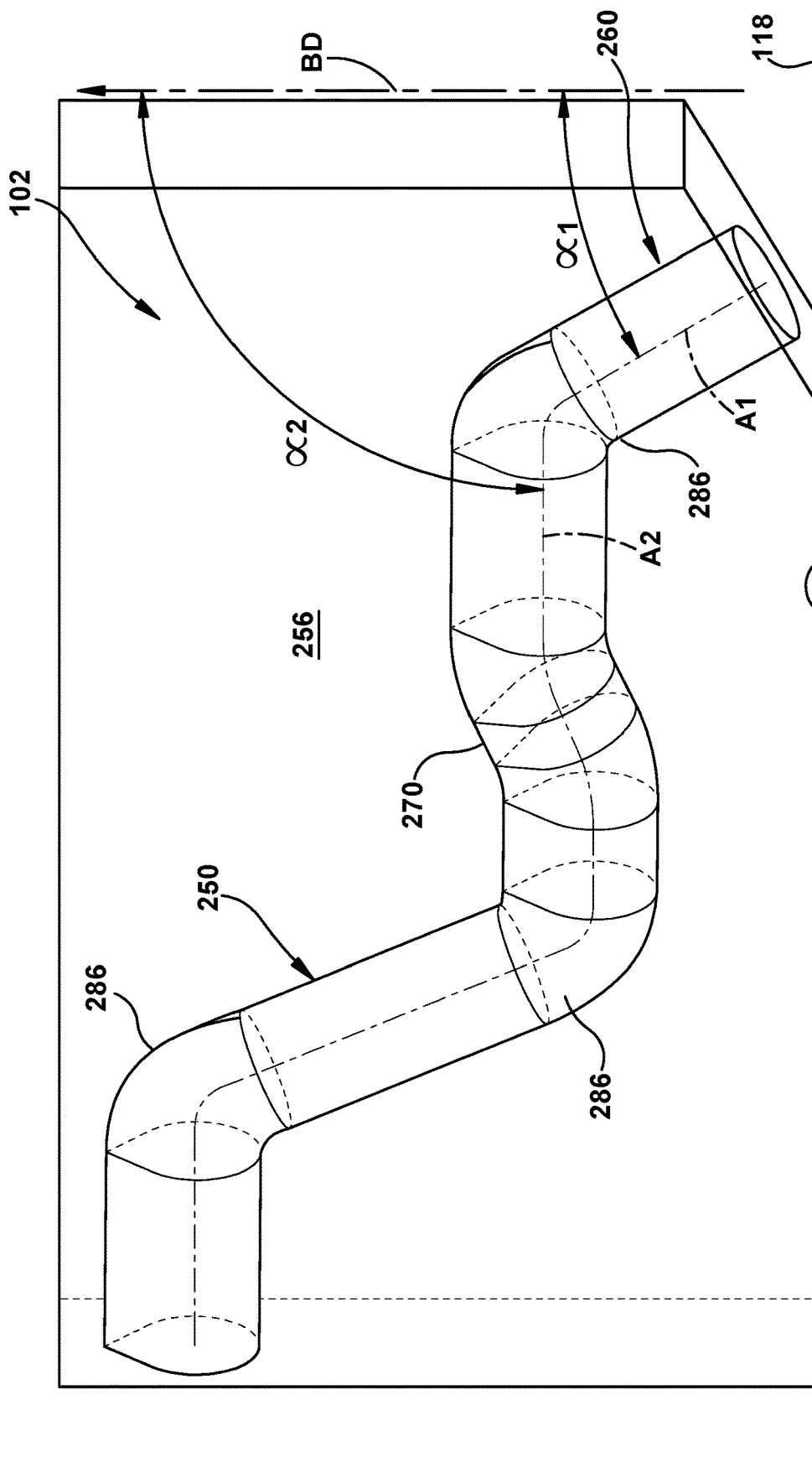
FIG. 4 shows a schematic side view of an object including a passage additively manufactured according to embodiments of the disclosure.

Referring to FIG. 4, a schematic side view of an object 102 additively manufactured according to embodiments of the disclosure is illustrated. Object 102 includes a passage 250 therein such as but not limited to a cooling channel or passage capable of carrying a coolant, e.g., air. Object 102 may be any additively manufactured object 102 including passage 250 therein, e.g., a hot gas path (HGP) object or component for a gas turbine system. During additive manufacture, as described herein, metal powder is selectively fused in a metal powder bed, i.e., raw material source 178, to form an initial shaped layer 254 of a body 256 of object 102. The selective fusing can then be repeated, as described herein, on a layer-by-layer basis to form body 256 of object 102 with passage 250 therein.

Passage 250 may include a first portion 260 aligned along an axis A1 oriented at an angle α1 that is less than approximately 45° from build direction BD. An "axis" of a passage may be a line that extends along a geographic center thereof. The axis can be geometrically defined in any manner desired, so long as it is done in a consistent manner amongst the varied passage cross-sectional shapes described herein.

First portion 260 may have any cross-sectional shape. Notably, because axis A1 of first portion 260 is at angle α1 that is less than approximately 45° from build direction BD, it is capable of additive manufacture with practically any cross-sectional shape, i.e., it does not require any support structures. FIGS. 5A-C show a number of common cross-sectional shapes for cooling passages at first portion 260. FIG. 5A shows a circular cross-section; FIG. 5B shows a rectangular cross-section (e.g., rectangular, square); and FIG. 5C shows a triangular cross-section (e.g., isosceles, equilateral, right) cross-section. Other cross-sectional shapes of first portion 260 are also contemplated such as, for example, elliptical, oval or polygon. Since first portion 260 is at angle α1 that is less than approximately 45° from build direction BD, it is capable of additive manufacture without any self-supporting surfaces.

Passage 250, as shown in FIG. 4, may also include a second portion 270 aligned along an axis A2 oriented at an angle α2 greater than approximately 45° from build direction BD. Second portion 270 is in fluid communication with first portion 260. As understood in the additive manufacturing field, open areas built at greater than approximately 45° from build direction BD are prone to collapse or formation in a mis-shapened manner due to gravity's impact during manufacture. In contrast to conventional passages, passage 250 includes a second portion 270 having a cross-sectional shape configured to allow additive manufacture despite axis A2 being aligned at an angle greater than approximately 45° from build direction BD. More particular, FIG. 6 shows a schematic view of a section of second portion 270 including at least one self-supporting top surface portion 272 including at least one region 274 within plane 275 aligned no greater than approximately 45° from build direction BD. In other words, second portion 270 has a self-supporting cross-sectional shape relative to axis A2 thereof and build direction BD. Second portion 270 can have a number of cross-sectional shapes to provide self-supporting top surface 272. FIG. 6 shows one example in which second portion 270 has a tear dropped cross-section having a pointed top 276 (e.g., cathedral ceiling) and a rounded bottom 278. Pointed top 276 creates region(s) 274 that are aligned at an angle β of no greater than approximately 45° from build direction BD, thus preventing the collapse or mis-shaping of second portion 270.

In addition to FIG. 6, FIGS. 7A-H show a number of common cross-sectional shapes for cooling passages at second portion 270. In FIGS. 7A-H, the build direction is vertical relative to the figure labels, e.g., "FIG. 7A". FIG. 7A shows a diamond cross-section; FIG. 7B shows an isosceles triangle with horizontal axis (A3) of symmetry cross-section; FIG. 7C shows a V-shape with round corners and vertical axis (A4) of symmetry cross-section; FIG. 7D shows a V-shape with round corners and horizontal axis (A5) of symmetry; FIG. 7E shows a V-shape with angled corners and vertical axis (A6) of symmetry; FIG. 7F shows a V-shape with angled corners and horizontal axis (A7) of symmetry; FIG. 7G shows a trapezoid with a sag 280 in an upper surface 282 thereof cross-section; and FIG. 7H shows an arcuate cross-section. Each cross-sectional shape creates at least one edge 273 (see, FIG. 6) and, by extension, one region 274 that is aligned at an angle β of no greater than approximately 45° from build direction BD, thus creating self-supporting top surface 272 and preventing the collapse or mis-shaping of second portion 270.

Passage 250 may also include one or more transition portions 286 joining first portion 260 and second portion 270, i.e., fluidly coupling the portions. FIG. 8 shows an enlarged version of passage 250 including two transition portions 286. Each transition portion 286 acts to smoothly convert to/from a cross-section of first portion 260 from/to a cross-section of second portion 270. For example, transition portion 286 gradually changes from a cross-section of first portion 260 with a non-supported top surface, e.g., circular, to a cross-section for second portion 270 with a self-supported top surface 272, e.g., 45° tear drop. The rate of change in cross-sectional geometry is proportional to the rate of change from a more vertical channel)(<45° to a more horizontal)(>45° with respect to build direction BD, or vice versa. Transition portion 286 is also devoid of a stepped section, i.e., a face or surface extending perpendicular from axis A that would create a restriction in flow.

Figure 9:
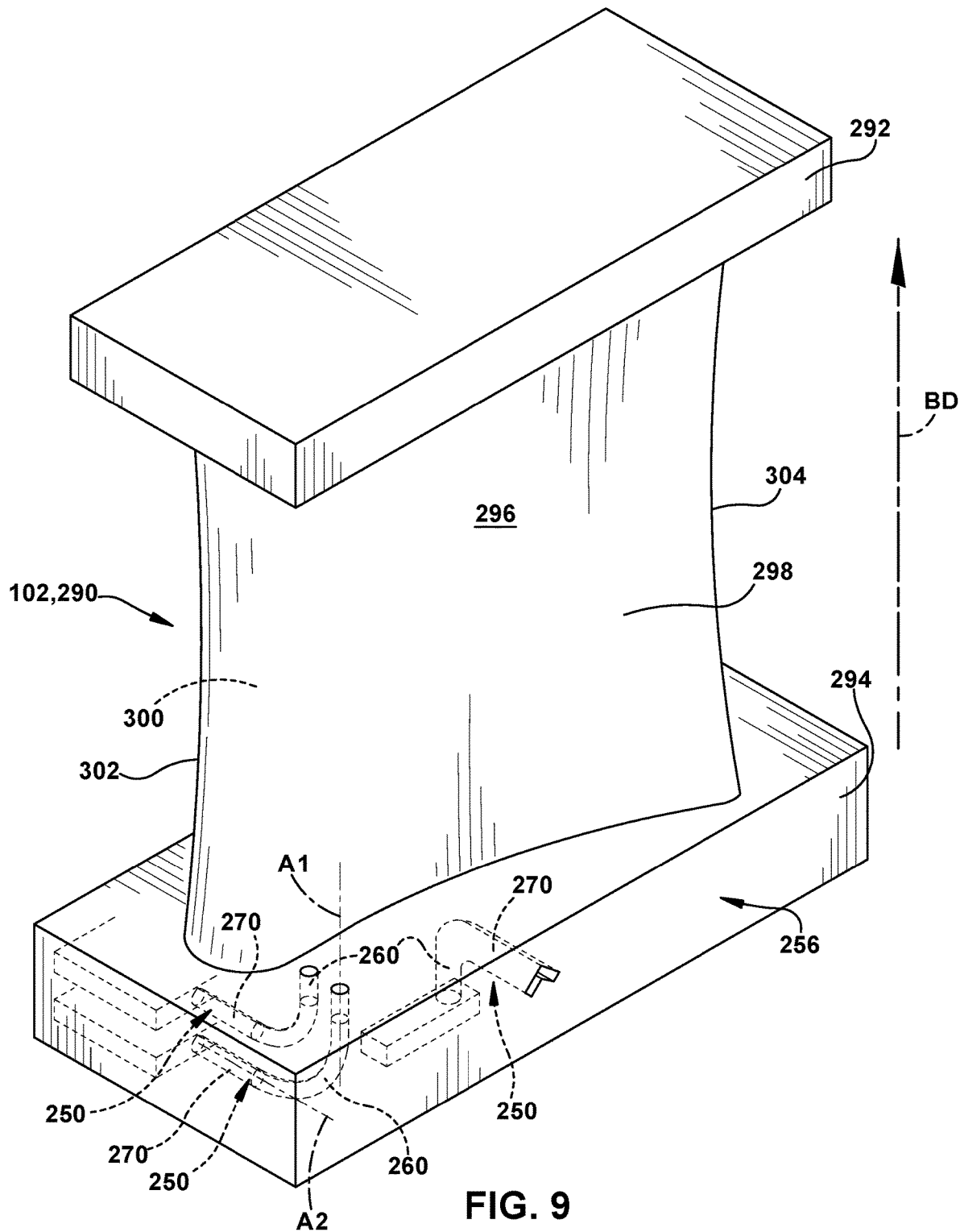
FIG. 9 shows an illustrative object in the form of an additively manufactured hot gas path component for a gas turbine system, and including a passage, according to embodiments of the disclosure.

Object 102 includes passage 250 in body 256. Object 102 may include any additively manufactured object. For example, FIG. 9 shows an illustrative object 102 in the form of an additively manufactured (AM) hot gas path (HGP) object (component) 290 for a gas turbine system, and including passage(s) 250 according to embodiments of the disclosure. In the example shown, AM HGP object 290 includes a stationary vane. The stationary vane may include an outer platform 292 by which the stationary vane attaches to stationary casing (not shown) of the turbomachine in a known fashion. The stationary vane may further include an inner platform 294 for positioning between adjacent turbine rotor blades (not shown). Platform 292, 294 define respective portions of the outboard and inboard boundary of the flow path through a turbine assembly. As understood in the field, airfoil 296 is the active component of the stationary vane that intercepts the flow of working fluid and directs it towards turbine rotor blades (not shown). It will be seen that airfoil 296 of the stationary vane includes a concave pressure side (PS) outer wall 298 and a circumferentially or laterally opposite convex suction side (SS) outer wall 300 extending axially between opposite leading and trailing edges 302, 304, respectively. Outer walls 298 and 300 also extend in the radial direction from platform 292 to platform 294. It is understood that passage 250 may be employed in a number of areas in an AM HGP object 102, such as the stationary vane shown. In the example shown, a number of passages 250 are positioned in platform 294. It is emphasized that the teachings of the disclosure can be applied to any AM turbine component, e.g., casings, rotating blades, combustion fuel nozzle, combustion transition piece, etc.

A number of passages 250 are shown incorporated into body 256 of additively manufactured object 102, i.e., AM HGP object 290. Passage 250 may include first portion 260 aligned along an axis A1 oriented less than approximately 45° from build direction BD. Passage 250 may also include second portion 270 aligned along an axis A2 oriented greater than approximately 45° from build direction BD. As noted, and as shown best in FIG. 6, second portion 270 includes at least one self-supporting top surface 272 (FIG. 6) including at least one region 274 (FIGS. 6, 7A-H) aligned no greater than approximately 45° from build direction BD. Passage 250 may be curvilinear along at least a portion of a length thereof that includes first portion 260 and second portion 270.

Use of a second portion 270 that includes at least one self-supporting top surface portion 272 including at least one region 274 aligned no greater than approximately 45° from build direction BD allows additive manufacture, e.g., selective and repetitive fusing, to create object 102 with passage 250 regardless of a selected build direction BD for object 102. That is, object 102 and passage 250 do not have to be initially arranged, e.g., in a CAD system, to have linear passages that are oriented at less than 45° relative to build direction BD. Hence, passage 250 may be curvilinear along at least a portion of a length thereof, where the portion of the length includes first portion 260 and second portion 270. Passages 250 are not limited to simply linear arrangements—they can be curvilinear, and do not need to be oriented at less than 45° relative to build direction BD. The need for supports where passage 250 is at more than 45° relative to build direction BD is also removed, or at the very least reduced. Each portion 260, 270, 286 may be sized to have substantially matching cross-sectional area. Alternately, each portion 260, 270, 286 may be sized to have different cross-sectional areas to manage cooling flow as needed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A passage incorporated into an additively manufactured object, the object having a single, vertical direction, the passage comprising:

a first portion aligned along an axis oriented less than approximately 45° from the single, vertical direction, wherein the first portion includes a first cross-sectional shape that does not require support structures; wherein the single, vertical direction is provided in the passage via a single vertical build process in the single, vertical direction, and a second portion aligned along an axis oriented greater than approximately 45° from the single, vertical direction, the second portion including at least one self-supporting top surface portion including at least one edge aligned no greater than approximately 45° from the single, vertical direction wherein the second portion has a self-supporting cross-sectional shape relative to the axis thereof and the single, vertical build direction, and wherein the self-supporting cross-sectional shape relative to the axis thereof and the single, vertical direction is selected from the group consisting of: V-shaped with round corners and vertical axis of symmetry, V-shaped with round corners and horizontal axis of symmetry, V-shaped with angled corners and vertical axis of symmetry, V-shaped with angled corners and horizontal axis of symmetry, wherein the first cross-sectional shape of the first portion varies in cross-sectional shape from the cross-sectional shape of the self-supporting cross-sectional shape of the second portion.

2. The passage of claim 1, wherein the first cross-sectional shape of the first portion has a cross-sectional shape relative to the axis thereof and the build direction selected from the group consisting of: circular, rectangular, or triangular.

3. The passage of claim 1, further comprising a transition portion joining the first portion and the second portion, wherein the transition portion is devoid of a stepped section.

4. The passage of claim 1, wherein the passage is curvilinear along at least a portion of a length thereof, wherein the at least the portion of the length includes the first portion and the second portion.

5. An additively manufactured (AM) hot gas path (HGP) object, the object having a single, vertical direction, the object comprising:

a body having a passage therein, the passage including:
   a first portion aligned along an axis oriented less than approximately 45° from the single, vertical direction, wherein the first portion includes a first cross-sectional shape that does not require support structures, wherein the single, vertical direction is provided in the passage via a single vertical build process in the single, vertical direction; and a second portion aligned along an axis oriented greater than approximately 45° from the single, vertical direction, the second portion including at least one self-supporting top surface portion including at least one edge aligned no greater than approximately 45° from the single, vertical direction, wherein the second portion has a self-supporting cross-sectional shape relative to the axis thereof and the single, vertical direction; and wherein the self-supporting cross-sectional shape relative to the axis thereof and the single, vertical build direction is selected from the group consisting of: V-shaped with round corners and vertical axis of symmetry, V-shaped with round corners and horizontal axis of symmetry, V-shaped with angled corners and vertical axis of symmetry, and V-shaped with angled corners and horizontal axis of symmetry, wherein the first cross-sectional shape of the first portion varies in cross-sectional shape from the cross-sectional shape of the self-supporting cross-sectional shape of the second portion.

6. The AM HGP object of claim 5, wherein the first cross-sectional shape of the first portion has a cross-sectional shape relative to the axis thereof and the build direction selected from the group consisting of: circular, rectangular, or triangular.

7. The AM HGP object of claim 5, further comprising a transition portion joining the first portion and the second portion, wherein the transition portion is devoid of a stepped section.

8. The AM HGP object of claim 5, wherein the passage is curvilinear along at least a portion of a length thereof, wherein the at least the portion of the length includes the first portion and the second portion.

9. A method to additively manufacture an object including a passage, the object having a single, vertical build direction, the method comprising:
  selectively fusing a metal powder in a metal powder bed to form an initial shaped layer of a body of the object; and
  repeating the selective fusing on a layer-by-layer basis to form the body of the object with the passage, wherein the passage includes:
    a first portion aligned along an axis oriented less than approximately 45° from the single, vertical build direction; and
    a second portion aligned along an axis oriented greater than approximately 45° from the single, vertical build direction, the second portion including at least one self-supporting top surface portion including at least one edge aligned no greater than approximately 45° from the single, vertical build direction.

10. The method of claim 9, wherein the first portion has a cross-sectional shape relative to the axis thereof and the single, vertical build direction selected from the group consisting of: circular, rectangular, or triangular.

11. The method of claim 9, wherein the second portion has a self-supporting cross-sectional shape relative to the axis thereof and the single, vertical build direction,
  wherein the self-supporting cross-sectional shape relative to the axis thereof and the single, vertical build direction is selected from the group consisting of: diamond, tear dropped having a pointed top and a rounded bottom, isosceles triangular with horizontal axis of symmetry, V-shaped with round corners and vertical axis of symmetry, V-shaped with round corners and horizontal axis of symmetry, V-shaped with angled corners and vertical axis of symmetry, V-shaped with angled corners and horizontal axis of symmetry, trapezoidal with a sag in an upper surface thereof, and arcuate.

12. The method of claim 9, wherein the passage further includes a transition portion joining the first portion and the second portion, wherein the transition portion is devoid of a stepped section.

13. The method of claim 9, wherein the selective fusing and the repeating the selective fusing create the object with the passage regardless of a selected single, vertical build direction for the object.

* * * * *